(12) United States Patent
de la Torre et al.

(10) Patent No.: US 7,261,171 B2
(45) Date of Patent: Aug. 28, 2007

(54) APPARATUS AND METHOD FOR CONVERTING MOVEMENTS OF A VEHICLE WHEEL TO ELECTRICITY FOR CHARGING A BATTERY OF THE VEHICLE

(75) Inventors: Roger A. de la Torre, Wentzville, MO (US); Matthew P. LaConte, Maryland Heights, MO (US)

(73) Assignee: Towertech Research Group, Wentzville, MO (US)

( * ) Notice: Subject to any disclaimer, the term of this patent is extended or adjusted under 35 U.S.C. 154(b) by 31 days.

(21) Appl. No.: 11/257,194

(22) Filed: Oct. 24, 2005

(65) Prior Publication Data

US 2007/0089919 A1     Apr. 26, 2007

(51) Int. Cl.
 *B60K 1/00* (2006.01)
(52) U.S. Cl. ................... 180/65.3; 180/166; 180/165
(58) Field of Classification Search ............... 180/65.3, 180/65.2, 65.6, 65.8, 242, 308, 285, 165, 180/166; 310/113, 114, 110; 290/16, 40 C
See application file for complete search history.

(56) References Cited

U.S. PATENT DOCUMENTS

| | | | | |
|---|---|---|---|---|
| 3,499,163 | A | * | 3/1970 | Verreault ...................... 290/16 |
| 3,939,935 | A | * | 2/1976 | Gill ........................... 180/65.3 |
| 4,181,188 | A | * | 1/1980 | Dessert ...................... 180/65.3 |
| 4,222,450 | A | * | 9/1980 | Fobbs ........................ 180/65.3 |
| 5,215,156 | A | * | 6/1993 | Stulbach et al. ........... 180/65.3 |
| 6,036,282 | A | * | 3/2000 | Clarke et al. ................. 303/7 |
| 6,220,381 | B1 | * | 4/2001 | Damron et al. ............ 180/65.3 |
| 6,828,691 | B2 | * | 12/2004 | Tu et al. ................... 290/40 C |
| 6,877,577 | B1 | * | 4/2005 | Smith ......................... 180/242 |

* cited by examiner

*Primary Examiner*—Hau Phan
(74) *Attorney, Agent, or Firm*—Thompson Coburn LLP

(57) ABSTRACT

An apparatus and its method of operation convert relative movements between a vehicle wheel and a body of the vehicle to electricity that is used to recharge a battery of the vehicle. The apparatus includes a generator provided on the vehicle and a linear motion to rotary motion converter that is connected between a wheel of the vehicle and an armature of the generator. Reciprocating movements of the wheel relative to the vehicle body are converted by the motion converter to rotations of the armature in the generator which produces electricity for recharging the battery of the vehicle.

20 Claims, 4 Drawing Sheets

APPARATUS AND METHOD FOR CONVERTING MOVEMENTS OF A VEHICLE WHEEL TO ELECTRICITY FOR CHARGING A BATTERY OF THE VEHICLE

BACKGROUND OF THE INVENTION (1) Field of the Invention

The present invention pertains to an apparatus and a method for converting relative movements between a vehicle wheel and a body of the vehicle to electricity, and using the electricity to recharge a battery of the vehicle. In particular, the present invention pertains to a generator provided on the vehicle and a linear motion to rotary motion converter that is connected between a wheel of the vehicle and an armature of the generator. Reciprocating movements of the wheel relative to the vehicle body are converted by the motion converter to rotations of the armature in the generator which produces electricity for recharging the battery of the vehicle.

(2) Description of Related Art

The increasing cost of fuels used to power internal combustion engine vehicles has lead to the development of hybrid vehicles. Hybrid vehicles are powered by both an internal combustion engine and an electric motor. The electric motor is powered by a battery provided on the vehicle. The internal combustion engine typically provides power to the battery through an electric generator. The generator is mechanically connected to the internal combustion engine and is electrically connected to the battery. Operation of the internal combustion engine rotates the armature of the generator relative to the stator of the generator, which produces electricity that charges the battery.

In the operation of a conventional hybrid vehicle, the output of the internal combustion engine is relied on in rotating the armature of the generator to produce the electricity that recharges the vehicle battery. In order to increase the efficiency of the hybrid vehicle, it would be beneficial to convert other mechanical movements of the vehicle to electricity to assist in recharging the vehicle battery.

SUMMARY OF THE INVENTION

The present invention provides an apparatus and method of converting the reciprocating movements of the wheels of a vehicle to electricity that recharges a battery of the vehicle. The apparatus converts the vertically reciprocating movements of each vehicle wheel relative to a body of the vehicle to electricity, that in turn is communicated to a battery of the vehicle to recharge the battery.

The apparatus of the invention employs a conventional generator for each wheel of the vehicle. The generator has a stator and an armature that is mounted to the stator for rotation relative to the stator. The rotation of the armature produces electricity from the generator. Each generator is electrically communicated with a battery of the vehicle, and the electricity produced by the generators recharges the battery.

A linear motion to rotary motion converter is provided for each generator. The motion converter is of a conventional design and is operatively connected to the armature of the associated generator. The converter includes a housing, an input rod that is mounted to the housing for reciprocating movement of the rod relative to the housing, and an output shaft that is mounted to the housing for rotation of the output shaft relative to the housing. Operation of the motion converter converts reciprocating movement of the rod relative to the converter housing to rotary movement of the output shaft of the converter. The converter output shaft is connected to the armature of the generator.

In a first embodiment of the invention, each generator stator is connected stationery to a wheel of the vehicle and the generator armature is connected to the output shaft of the associated motion converter. The input rod of the motion converter is connected to the vehicle body. On relative movement between the vehicle wheel and the vehicle body when the vehicle is operated over an uneven road surface, the movements of the wheel relative to the vehicle body produce reciprocating movements of the motion converter input rod relative to the motion converter housing. This produces rotation in the converter output shaft which in turn rotates the armature of the generator, producing electricity. The electricity produced by each generator is electrically communicated with the battery and recharges the battery.

In an alternate embodiment of the apparatus, the motion converter is connected between the generator armature and the vehicle wheel, and the generator stator is connected to the vehicle body.

In both embodiments of the invention, the vertically reciprocating movements of each vehicle wheel as the vehicle is operated over an uneven road surface produces rotation in the armature of the associated generator that in turn produces electricity that charges the vehicle battery.

DESCRIPTION OF THE DRAWING FIGURES

Further features of the present invention are set forth in the following detailed description of the preferred embodiment of the invention and in the drawing figures wherein.

DETAILED DESCRIPTION OF THE PREFERRED EMBODIMENT

Figure 1:
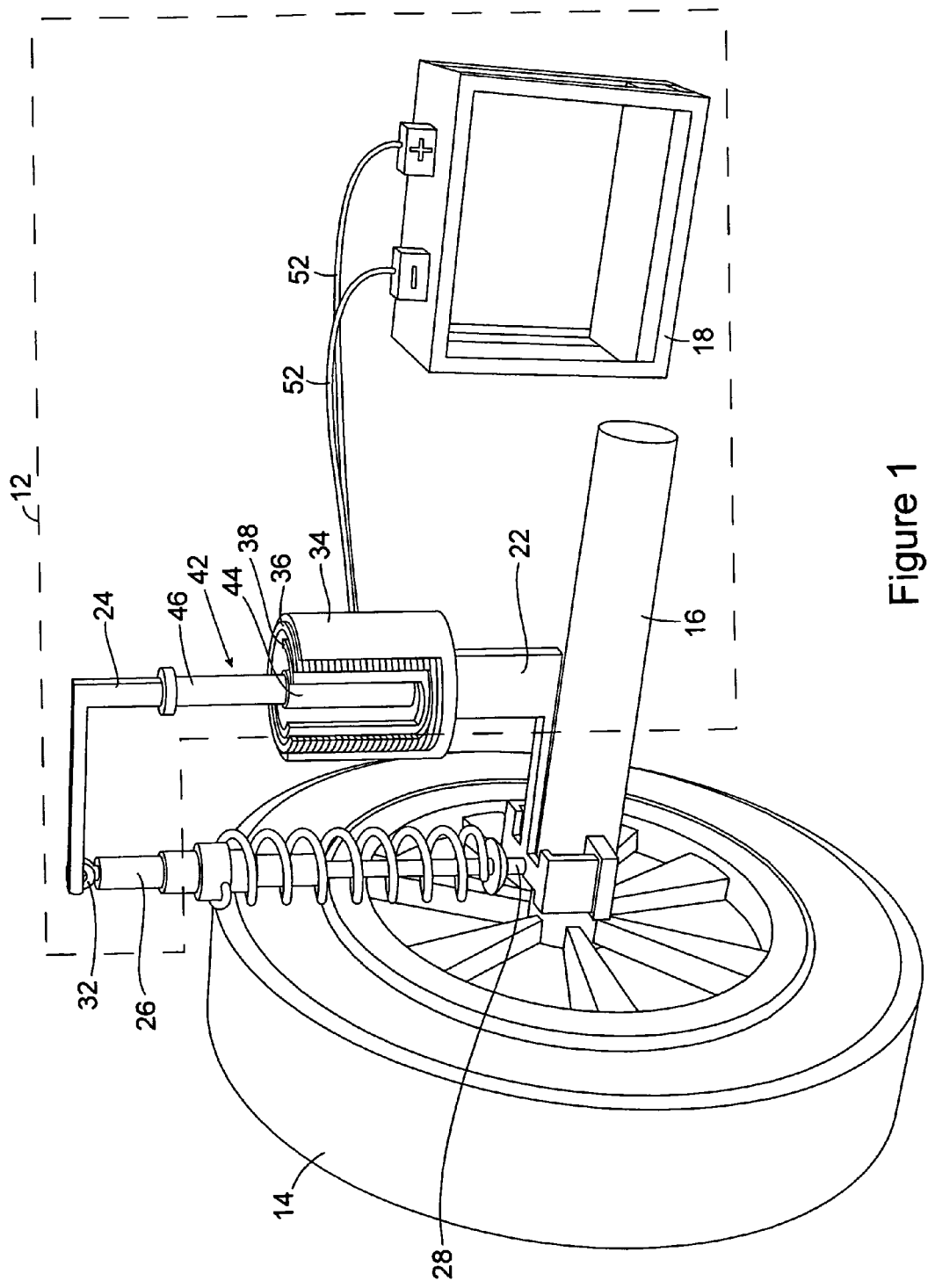
FIG. 1 shows a schematic representation of a first embodiment of the invention in an at rest condition of the apparatus.

The apparatus of the invention and its method of use have been designed for use with a wheeled vehicle. In the preferred embodiment, the wheeled vehicle is an automobile. However, the general concept of the invention can be employed in most any type of wheeled vehicle where the wheel is supported from a body of the vehicle by a suspension system that enables the wheel to move relative to the vehicle body in response to the wheel rolling over an uneven road surface. Because the concept of the invention may be employed with most any type of wheeled vehicle, the vehicle on which the invention is used will not be described in detail or shown in detail in the drawing figures.

FIG. 1 shows a schematic representation of a first embodiment of the apparatus of the invention provided on a wheeled hybrid vehicle. Because the type of vehicle with which the apparatus of the invention is employed is not important for the operation of the apparatus, the body 12 of the vehicle is represented by the dashed lines shown in FIGS. 1-4. The vehicle includes a plurality of wheels 14, each of which is mounted for rotation on an axle 16. The apparatus of the invention is shown with only one wheel of the vehicle in the drawing figures, but it should be understood that the apparatus may be used with each vehicle wheel. The wheel 14 and axle 16 are represented schematically in the drawing figures, and are intended to represent the many different types of wheels and axle assemblies employed on vehicles. The vehicle is also provided with a battery 18 that is mounted at a storage location on the vehicle body 12, as is conventional. In the preferred embodiment of the invention, the battery 18 is employed as a power source for the electric motor (not shown) of the hybrid vehicle.

A wheel related support piece 22 is shown schematically in the drawing FIGS. 1-4. The wheel related piece 22 can be any component part of the vehicle that is supported on the vehicle wheel 14. The wheel 14 rotates relative to the wheel related piece 22 during operation of the vehicle, but the wheel related piece 22 remains substantially stationary relative to the wheel 14 as the wheel reciprocates along a generally vertical line in response to the wheel rolling over an uneven road surface. Thus, the wheel related piece 22 also moves in generally vertically reciprocating movements in response to the reciprocating movement of the wheel 14 as the wheel rolls over an uneven road surface.

A body related support piece 24 is also shown in the drawing FIGS. 1-4. The body related piece 24 can be any component part of the vehicle that remains substantially stationary to the vehicle body 12 as the vehicle is operated. The body related piece 24 is operatively connected to the vehicle body 12, meaning that the body related piece 24 is either directly connected to the vehicle body 12, or is connected to the vehicle body through other component parts of the vehicle whereby the body related piece 24 remains substantially stationary relative to the vehicle body 12 as the vehicle body moves during operation of the vehicle.

A shock absorber 26 is shown operatively connected between the wheel related piece 22 and the body related piece 24. A first end 28 of the shock absorber is operatively connected to the wheel related piece 22. Again, by being operatively connected to the wheel related piece 22, what is meant is that the first end 28 of the shock absorber is either directly connected to the wheel related piece 22, or is connected to the wheel related piece 22 through other component parts of the vehicle whereby the shock absorber first end 28 moves with the wheel related piece 22. The second, opposite end 32 of the shock absorber is operatively connected to the body related piece 24. Again, by being operatively connected, the shock absorber second end 32 moves with the body related piece 24.

A generator 34 is operatively connected to the wheel related piece 22. Again, by being operatively connected, what is meant is that the generator 34 is either directly connected to the wheel related piece 22, or is connected to the wheel related piece 22 by other component parts of the vehicle whereby the generator 34 moves with the wheel related piece 22. The generator 34 has a typical construction and basically is comprised of a stator 36 and an armature 38 that is received in the stator for rotation relative to the stator. This is only one of the known basic constructions of generators that may be employed with the apparatus of the invention. It is only necessary that the generator 34 have an armature that rotates relative to a stator. The armature could be mounted outside the stator in another, equivalent construction of the generator.

A motion converter 42 is operatively connected between the generator armature 38 and the body related piece 24. The motion converter 42 is operated to rotate the armature 38. There are many different types of motion converters known in the prior art that could be used as the motion converter 42 of the invention. Because the motion converter 42 is employed to rotate the armature 38 relative to the stator 36, it is not necessary that the motion converter 42 have a large power output. The only resistance to the rotation of the armature 38 relative to the stator 36 is the friction resistance of the bushings or bearings supporting the armature. Thus, the motion converter 42 can be very small. The basic requirements of the motion converter 42 is that it have a linearly reciprocating input along the axis of rotation of the armature 38 and a rotary output that rotates about the axis of the armature.

The motion converter 42 is a mechanical linear motion to rotary motion converter of basic construction. The motion converter 42 shown in the drawing figures has a housing 44, an input plunger or input rod 46 mounted for reciprocating movement in the housing 44, and an output shaft (not shown) mounted for rotation relative to the housing. The input rod 46 is operatively connected to the body related piece 24 for movement with the body related piece. The output shaft is operatively connected to the generator armature 38 for rotation of the armature with the output shaft. The operation of the motion converter 42 converts the linear reciprocating movement of the input rod 46 to rotation of the output shaft. Thus, relative movement between the vehicle body 12 and the vehicle wheel 14 causes the motion converter input rod 46 to be reciprocated in the converter housing 44. This produces rotation of the motion converter output shaft which in turn rotates the generator armature 38 relative to the stator 36. This causes the generator 34 to generate electricity that is communicated to the vehicle battery 18 by the electrical wiring 52 that communicates the generator 34 with the battery 18.

Figure 2:
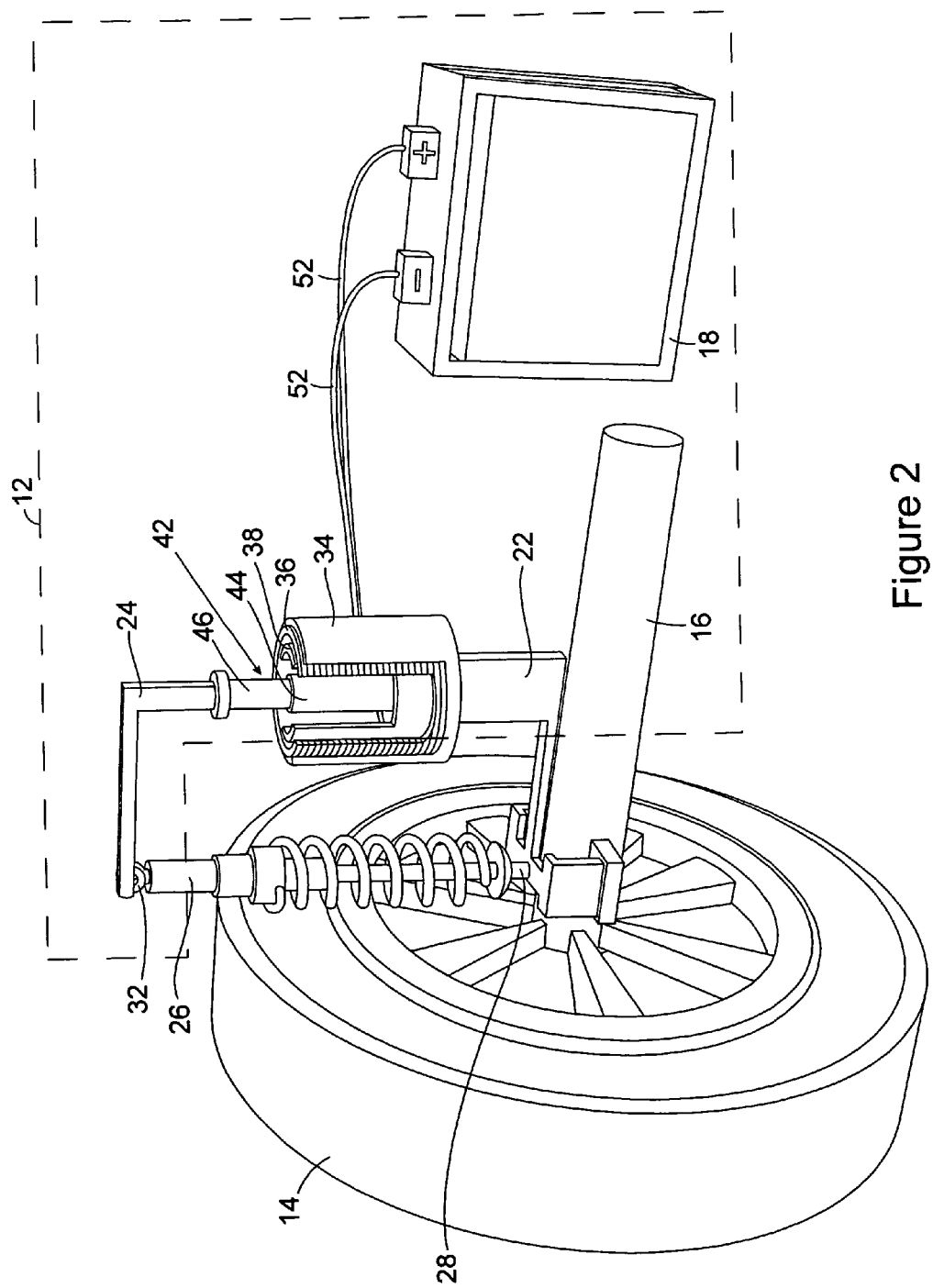
FIG. 2 shows the apparatus of FIG. 1 where operation of the vehicle has caused the vehicle wheel to begin to move upwardly relative to the vehicle body.
Figure 3:
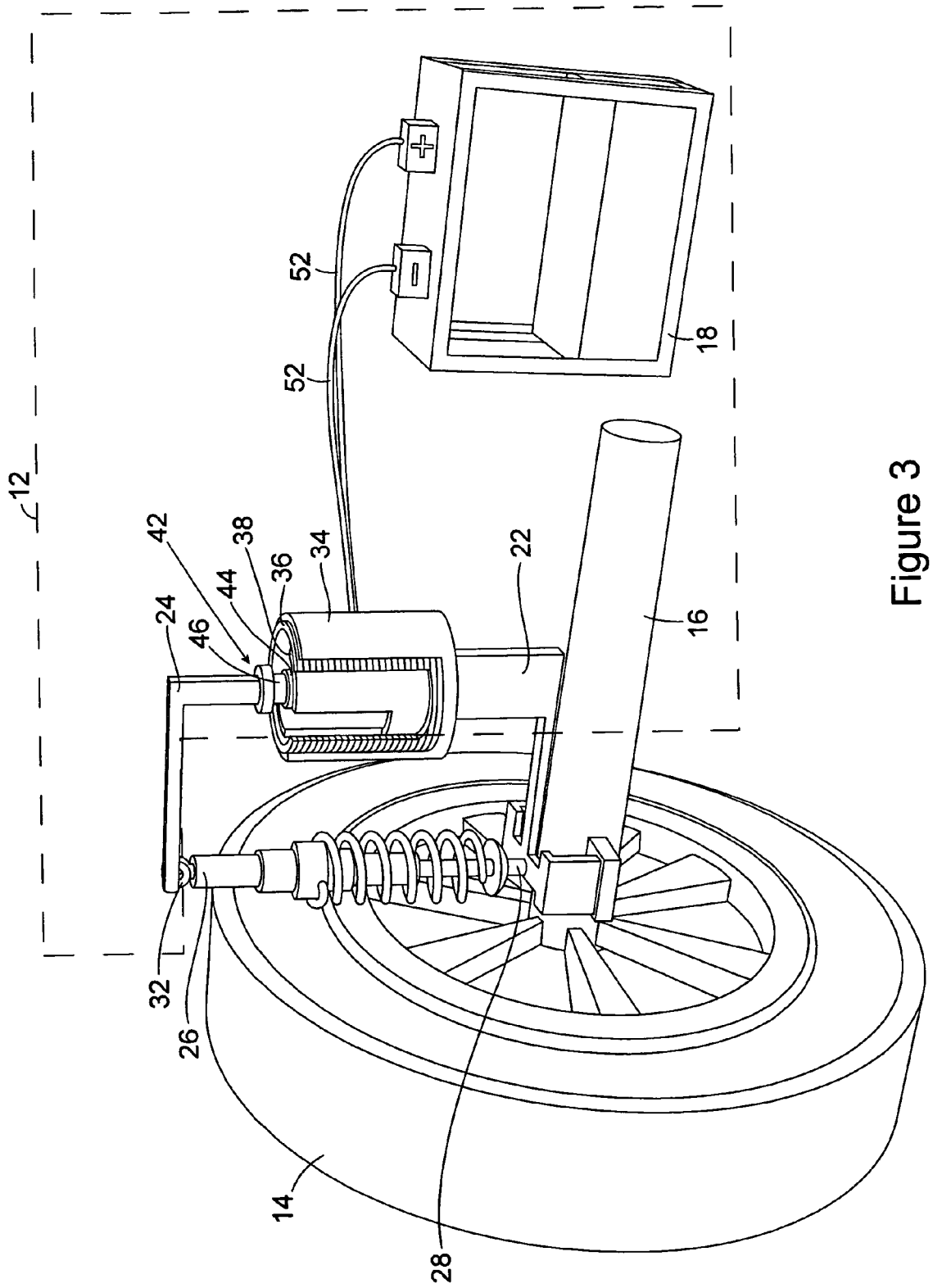
FIG. 3 is a subsequent view to that of FIG. 2 where the vehicle wheel has moved upwardly relative to the vehicle body to its greatest extent.

FIGS. 1-3 show the sequence steps of operation of the apparatus. FIG. 1 illustrates the relative positions of the component parts of the invention prior to operation of the vehicle. The motion converter input rod 46 is positioned at its extended position from the motion converter housing 44. In FIG. 1, the vehicle is at rest and the component parts of the invention are at rest with there being no relative movement between the component parts.

On operation of the vehicle, the vehicle wheel 14 rolls over a road surface. When the wheel 14 rolls over an uneven road surface, the wheel 14 is caused to move relative to the vehicle body 12 due to the wheel 14 passing over bumps in the road and/or passing through holes in the road. As the wheel 14 moves relative to the vehicle body 12, the wheel related piece 22 is caused to move in reciprocating movements relative to the body related piece 24. This in turn causes the motion converter input rod 46 to move in linearly reciprocating movements relative to the motion converter housing 44 which causes rotation of the motion converter output shaft. The output shaft rotation causes the armature 38 to rotate relative to the stator 36, thus producing electricity from the generator 34.

Figure 4:
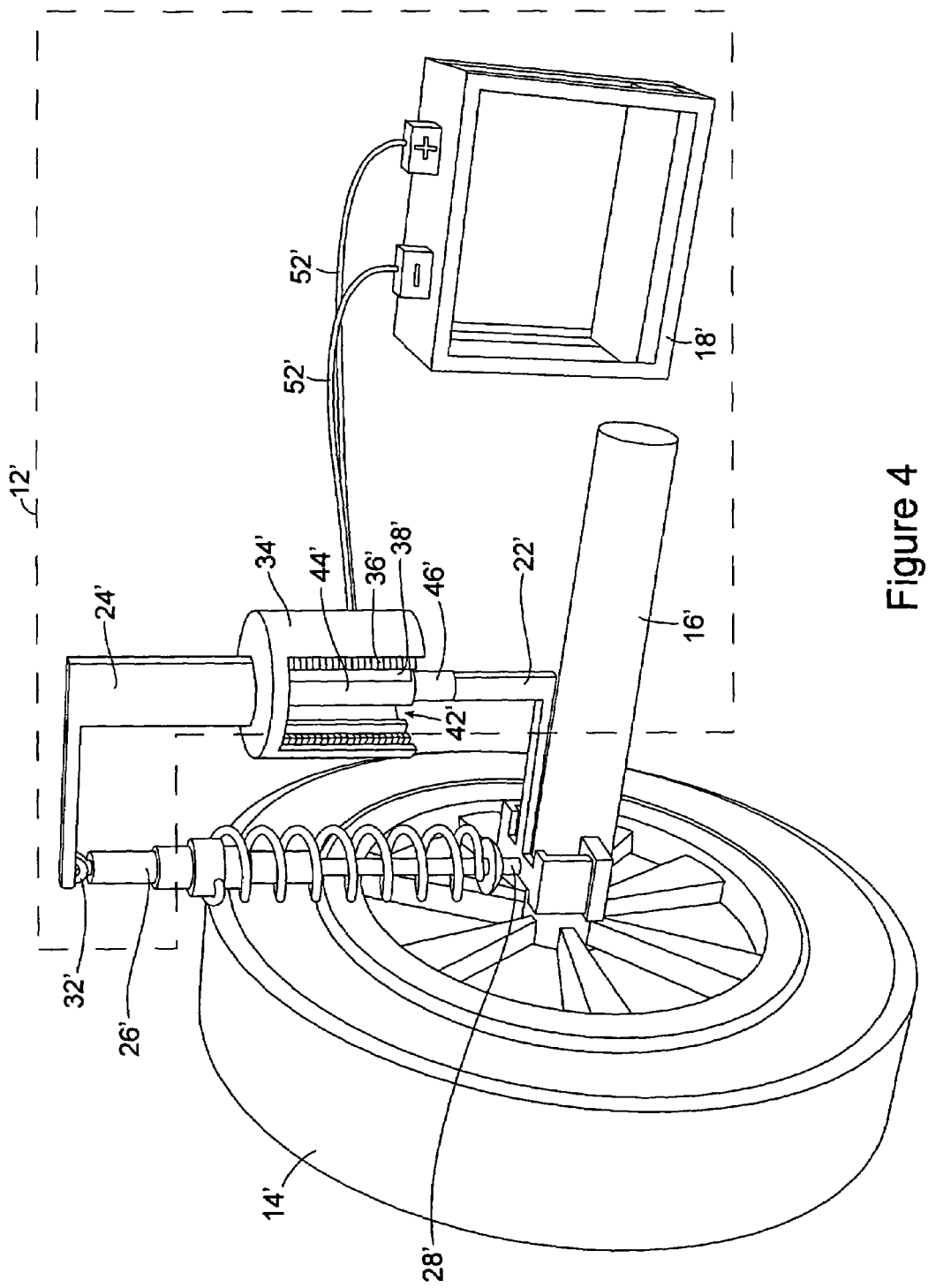
FIG. 4 is a view similar to that of FIG. 1, but showing an alternate embodiment of the invention.

FIG. 4 shows an alternate embodiment of the apparatus of the invention. The component parts of the invention are the same as those of the first described embodiment and are labeled by the same reference numbers followed by a prime('). The only difference in the embodiment of FIG. 4 is that the positions of the generator 34' and the motion converter 42' are inverted. The generator 34' is now operatively connected to the body related piece 24', and the motion converter 42' is now operatively connected to the wheel related piece 22'. Apart from this structural difference, the apparatus of the invention shown in FIG. 4 is the same as that shown in FIGS. 1-3, and the operation of the apparatus is the same.

Although the apparatus of the invention and its method of operation have been described above by reference to specific embodiments, it should be understood that modifications and variations could be made to the apparatus and its method of operation without departing from the intended scope of the following claims.

The invention claimed is:

1. An apparatus for converting movements of a wheel of a vehicle relative to a body of the vehicle to electricity for charging a battery of the vehicle, the apparatus comprising:
   a generator mounted on the vehicle, the generator having a stator and an armature that is mounted to the stator for rotation of the armature relative to the stator to produce electricity from the generator;
   a battery mounted on the vehicle, the battery being connected in electrical communication with the generator for receiving electricity produced by the generator;
   a wheel related piece operatively connected to the wheel of the vehicle for reciprocating movement of the wheel related piece in response to movement of the wheel;
   a body related piece operatively connected to the body of the vehicle for movement of the body related piece in response to movement of the body; and,
   a motion converter that is operatively connected to the armature and to one of the wheel related piece and the body related piece with the stator being operatively connected to the other of the wheel related piece and the body related piece, the motion converter being operative to convert relative reciprocating movement between the wheel and the body to rotary movement of the armature relative to the stator.

2. The apparatus of claim 1, further comprising:
   the wheel related piece being stationary relative to the wheel during movement of the wheel; and,
   the body related piece being stationary relative to the body during movement of the body.

3. The apparatus of claim 1, further comprising:
   the motion converter being operatively connected to the armature and the body related piece; and,
   the stator being operatively connected to the wheel related piece.

4. The apparatus of claim 1, further comprising:
   the motion converter being operatively connected to the armature and the wheel related piece; and,
   the stator being operatively connected to the body related piece.

5. An apparatus for converting movements of a wheel of a vehicle relative to a body of the vehicle to electricity for charging a battery of the vehicle, the apparatus comprising:
   a generator mounted on the vehicle, the generator having a stator and an armature that is mounted to the stator for rotation of the armature relative to the stator to produce electricity from the generator;
   a battery mounted on the vehicle, the battery being connected in electrical communication with the generator for receiving electricity produced by the generator;
   a wheel related piece operatively connected to the wheel of the vehicle for movement of the wheel related piece in response to movement of the wheel;
   a body related piece operatively connected to the body of the vehicle for movement of the body related piece in response to movement of the body;
   a motion converter that is operatively connected to the armature and to one of the wheel related piece and the body related piece with the stator being operatively connected to the other of the wheel related piece and the body related piece, the motion converter being operative to convert relative movement between the wheel and the body to rotary movement of the armature relative to the stator;
   a shock absorber operatively connected between the wheel and the body;
   the generator being operatively connected to one end of the shock absorber; and,
   the motion converter being operatively connected to an opposite end of the shock absorber.

6. An apparatus for converting movements of a wheel of a vehicle relative to a body of the vehicle to electricity for charging a battery of the vehicle, the apparatus comprising:
   a generator mounted on the vehicle, the generator having a stator and an armature that is mounted to the stator for rotation of the armature relative to the stator to produce electricity from the generator;
   a battery mounted on the vehicle, the battery being connected in electrical communication with the generator for receiving electricity produced by the generator;
   a wheel related piece operatively connected to the wheel of the vehicle for movement of the wheel related piece in response to movement of the wheel;
   a body related piece operatively connected to the body of the vehicle for movement of the body related piece in response to movement of the body;
   a motion converter that is operatively connected to the armature and to one of the wheel related piece and the body related piece with the stator being operatively connected to the other of the wheel related piece and the body related piece, the motion converter being operative to convert relative movement between the wheel and the body to rotary movement of the armature relative to the stator;
   the wheel related piece being operatively connected to the wheel for reciprocating movement of the wheel related piece in response to movement of the wheel relative to the body; and,
   the motion converter being operative to convert the reciprocating movement of the wheel related piece to rotary movement of the armature.

7. The apparatus of claim 6, further comprising:
   the wheel related piece being operatively connected to the wheel for vertically reciprocating movement of the wheel related piece in response to movement of the wheel relative to the body.

8. An apparatus for converting movements of a wheel of a vehicle relative to a body of the vehicle to electricity for charging a battery of the vehicle, the apparatus comprising:
   a generator mounted on the vehicle, the generator having a stator and an armature that is mounted to the stator for rotation of the armature relative to the stator to produce electricity from the generator;
   a battery mounted on the vehicle, the battery being connected in electrical communication with the generator for receiving electricity produced by the generator;
   a wheel related piece operatively connected to the wheel of the vehicle for movement of the wheel related piece in response to movement of the wheel;
   a body related piece operatively connected to the body of the vehicle for movement of the body related piece in response to movement of the body;
   a motion converter that is operatively connected to the armature and to one of the wheel related piece and the body related piece with the stator being operatively connected to the other of the wheel related piece and the body related piece, the motion converter being operative to convert relative movement between the wheel and the body to rotary movement of the armature relative to the stator; and, the motion converter being mechanical and having a housing and a rod mounted on the housing for reciprocating movement of the rod relative to the housing.

9. An apparatus for converting movements of a wheel of a vehicle relative to a body of the vehicle to electricity for charging a battery of the vehicle, the apparatus comprising:
a generator mounted on the vehicle, the generator having a stator and an armature that is mounted to the stator for rotation of the armature relative to the stator to produce electricity from the generator;
a battery mounted on the vehicle, the battery being connected in electrical communication with the generator for receiving electricity produced by the generator;
a wheel related piece operatively connected to the wheel of the vehicle for reciprocating movement of the wheel related piece in response to movement of the wheel relative to the body; and,
a means for converting the reciprocating movement of the wheel related piece to rotation of the armature.

10. The apparatus of claim 9, further comprising:
the wheel related piece being operatively connected to the wheel for vertically reciprocating movement of the wheel related piece in response to movement of the wheel relative to the body.

11. The apparatus of claim 9, further comprising:
the wheel related piece being stationary relative to the wheel during movement of the wheel.

12. The apparatus of claim 9, further comprising:
a body related piece being operatively connected to the body of the vehicle for movement of the body related piece in response to movement of the body; and,
the means for converting the movement of the wheel related piece to rotation of the armature being operatively connected between the wheel related piece and the body related piece.

13. The apparatus of claim 12, further comprising:
the body related piece being stationary relative to the body during movement of the body.

14. The apparatus of claim 9, further comprising:
a body related piece operatively connected to the body of the vehicle for movement of the body related piece in response to movement of the body;
the means for converting the motion of the wheel related piece to rotation of the armature being operatively connected to the armature and to the body related piece; and,
the stator being operatively connected to the wheel related piece.

15. The apparatus of claim 9, further comprising:
a body related piece operatively connected to the body of the vehicle for movement of the body related piece in response to movement of the body;
the means for converting the motion of the wheel related piece to rotation of the armature being operatively connected to the armature and to the wheel related piece; and,
the stator being operatively connected to the body related piece.

16. An apparatus for converting movements of a wheel of a vehicle relative to a body of the vehicle to electricity for charging a battery of the vehicle, the apparatus comprising:
a generator mounted on the vehicle, the generator having a stator and an armature that is mounted to the stator for rotation of the armature relative to the stator to produce electricity from the generator;
a battery mounted on the vehicle, the battery being connected in electrical communication with the generator for receiving electricity produced by the generator;
a wheel related piece operatively connected to the wheel of the vehicle for movement of the wheel related piece in response to movement of the wheel relative to the body;
a means for converting the movement of the wheel related piece to rotation of the armature; and,
the wheel related piece being operatively connected to the wheel for reciprocating movement of the wheel related piece in response to movement of the wheel relative to the body.

17. An apparatus for converting movements of a wheel of a vehicle relative to a body of the vehicle to electricity for charging a battery of the vehicle, the apparatus comprising:
a generator mounted on the vehicle, the generator having a stator and an armature that is mounted to the stator for rotation of the armature relative to the stator to produce electricity from the generator;
a battery mounted on the vehicle, the battery being connected in electrical communication with the generator for receiving electricity produced by the generator;
a wheel related piece operatively connected to the wheel of the vehicle for movement of the wheel related piece in response to movement of the wheel relative to the body; and,
a means for converting the movement of the wheel related piece to rotation of the armature; and,
a shock absorber operatively connected between the wheel and the body;
the generator being operatively connected to one end of the shock absorber; and,
the means for converting the movement of the wheel related piece to rotation of the armature being operatively connected to an opposite second end of the shock absorber.

18. A method of converting movements of a wheel of a vehicle relative to a body of the vehicle to electricity and charging a battery of the vehicle, the method comprising:
providing a generator on the vehicle with the generator having a stator and an armature that is mounted to the stator for rotation of the armature relative to the stator to produce electricity from the generator;
connecting the generator in electrical communication with the battery to supply the electricity produced by the generator to the battery;
providing a motion converter on the vehicle, the motion converter being operative to convert reciprocating motion to rotary motion;
operatively connecting the motion converter to the armature and to one of the wheel and the body and operatively connecting the other of the wheel and body to the stator whereby the motion converter converts reciprocating relative movement between the wheel and body to rotary movement of the armature relative to the stator.

19. The method of claim 18, further comprising:
operatively connecting the motion converter to the armature and the wheel and operatively connecting the stator to the body.

20. The method of claim 18, further comprising:
operatively connecting the motion converter to the armature and the body and operatively connecting the stator to the wheel.

* * * * *